Patented Sept. 18, 1928.

1,684,920

UNITED STATES PATENT OFFICE.

MORRIS S. KHARASCH, OF COLLEGE PARK, MARYLAND, ASSIGNOR TO ELI LILLY AND COMPANY, OF INDIANAPOLIS, INDIANA, A CORPORATION OF INDIANA.

WATER-SOLUBLE ORGANIC COMPOUND OF ANTIMONY AND PROCESS OF PRODUCING IT.

No Drawing.     Application filed January 24, 1928.  Serial No. 249,196.

The present invention relates to water-soluble organic stibinous compounds, in which the antimony is bonded by one bond to a carbon atom of an organic radical; and to the process of producing such water-soluble stibinous compounds.

More specifically, the water-soluble organic stibinous compounds which are produced by my invention have the antimony atom bonded by at least one bond to a carbon atom of an organic radical, and have the antimony atom bonded by its remaining bond or bonds to a sulphur atom or atoms, and have each sulphur atom bonded to a carbon atom of an organic radical containing an acid group which has a free valence bond capable of being attached either to hydrogen or to a metal. While my invention contemplates that the first-named organic radical shall be either an aliphatic or an aromatic radical, yet I prefer that it be an aromatic radical, specifically a phenyl radical, and desirably that it be a substituted aromatic radical, and specifically a substituted phenyl radical in which one or more of the hydrogen atoms of the phenyl group have been replaced by an amine group or groups, and/or by a hydroxyl group or groups, and/or by a substituted amine or hydroxyl group or groups. The organic radical bonded to the sulphur may be either aliphatic or aromatic.

In the past, organic compounds of carbon-bonded trivalent antimony have found no application as therapeutic agents, so far as I know, due to the fact that they are relatively insoluble in water. Illustrations of such known organic compounds of trivalent antimony are:

(1) p-acetyl amino phenyl stibinous chloride:

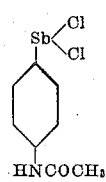

(2) m-amino phenyl stibinous chloride hydrochloride:

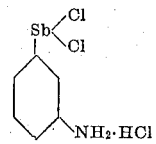

Thus, while derivatives of organic compounds of pentavalent antimony have found considerable application as general therapeutic agents, especially in trypanosomiasis, the organic compounds of carbon-bonded trivalent antimony have not been so used so far as I know.

By my invention, I make organic compounds of carbon-bonded trivalent antimony effectively available, for uses generally similar to those of organic compounds of pentavalent antimony.

In my Patent No. 1,589,599, granted June 22, 1926, I describe a general method whereby organo-metallic compounds can be introduced into water solution by the use of acids containing sulfhydryl groups; including thioglycolic acid, β-sulfhydryl butyric acid, thiomalic acid, thiosalicylic acid, sulfhydryl benzene sulfonic acid, mercapto benzothiazole carboxylic acid, and substitution products of such acids, as well as other compounds containing a sulfhydryl (—SH) group or groups and an acidic group or groups such as the carboxylic group (—COOH) or the sulfonic group (—SO₃H). That patent, although including claims covering generically certain water-soluble organo-metallic compounds and the process of producing them when the metal M therein referred to has a valence greater than one, and although giving an antimony compound as one example of such generic type of compounds, was directed in its more specific claims to mercury compounds; and in addition, the antimony compound there disclosed was of pentavalent antimony and not trivalent antimony; so that for both reasons claims directed specifically to trivalent antimony compounds could not be obtained therein. This present application, on the other hand, is directed specifically to trivalent antimony compounds; and the more specific claims of the present application are directed to substituted-aromatic trivalent-antimony thio-acid compounds, especially to substituted-phenyl trivalent-antimony thio-acid compounds, and their derivatives, and to the process of producing them.

This present invention permits the production of organic trivalent-antimony compounds which are therapeutically active, which have a relatively small toxicity, and which are quite readily soluble in water.

For instance, if the p-acetyl amino-phenyl stibinous chloride given under formula 1 above is treated, in a suitable solvent, with a thio-acid, such as thiosalicylic acid, the following reaction takes place:

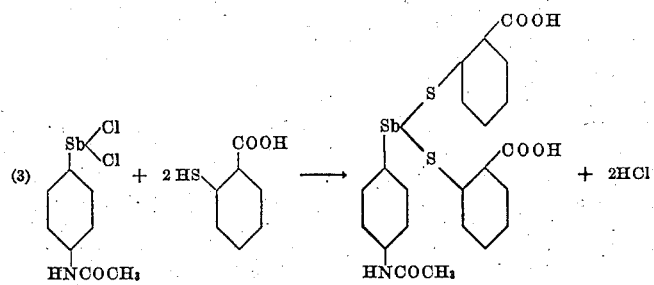

This is a compound which is readily soluble in sodium bicarbonate solution, to form the sodium salt, which is soluble in water. The reaction is obviously as follows:

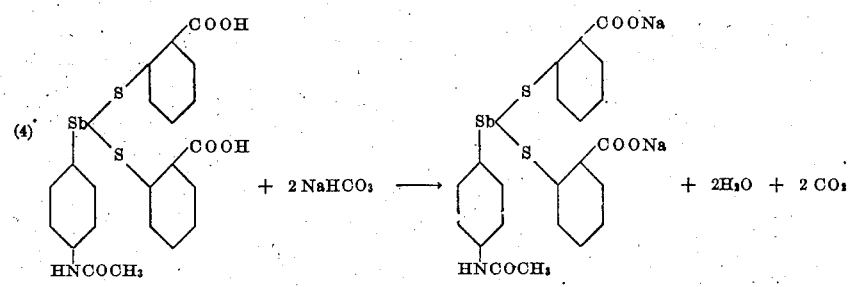

Of course, this sodium salt is given merely as one example; as obviously other salts may also be produced, such for instance as the potassium, calcium, or ammonium salts as other examples of salts of metals which would ordinarily be soluble in water. The alkali metals are preferable, although my invention is not limited to alkali metals in forming these salts.

For the initial organic trivalent-antimony compounds used in the preparation of substances of my present invention, the general formula may be (5) 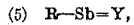 R—Sb=Y, in which R is any organic radical having a carbon atom directly attached by one bond to the antimony, and Y is a non-metallic divalent atom other than of the sulphur family (in which family I mean to include sulphur, selenium, and tellurium and these only) or two non-metallic monevalent atoms, such as members of the halogen family. The organic radical which R represents may broadly be any organic radical of the aliphatic or aromatic series; but I prefer that it be an aromatic radical, such as the phenyl group, and that this aromatic radical be a substituted aromatic radical, such as a substituted phenyl group; and in most cases it seems better that Y be two atoms of chlorine, for instance, rather than a single atom of oxygen, because the chlorides are more soluble in organic re-agents than are the oxides.

For the thio acid used in the process, the general formula is H—S—$R_{Ac}$—H in which $R_{Ac}$ as an aromatic or aliphatic organic radical having a carbon atom attached to the sulfhydryl group and also containing an acid group which has a free valence bond capable of being attached either to hydrogen to form the acid, as shown, or to a metal to form a salt of such acid. This would give a final product containing a radical of the following typical formula:

(6) 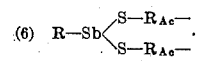

In this final product, the antimony atom is directly bonded by one bond to a carbon atom of the radical R, and is directly bonded by two bonds to sulphur atoms; and each sulphur atom is directly bonded by one bond to a carbon atom of an organic radical which contains an acid group such as above defined; so that such product, by the substitution of sodium or potassium for hydrogen at the free bond of the acid group, permits the preparation of a sodium or potassium salt soluble in water.

Indeed, I prefer to use the sulfhydryl sulfonic acids as the thio acids. These have the advantage in that when they react with the initial trivalent antimony compound they form acids which are themselves somewhat water soluble, and which also can react with alkalis to form water-soluble salts. In this respect, the derivatives obtained from the sulfhydryl sulfonic acids are different from those obtained from most other thio acids, in that with those other thio acids the acid formed by the reaction of the initial trivalent-antimony compound with the initial thio acid produces acids which are themselves not usually materially soluble in water, so that it is necessary to produce salts thereof in order to get any material water solubility. In consequence, by using sulfhydryl sulfonic acids, it is possible to get an aqueous solution of any desired hydrogen ion concentration within a wide range extending on both sides of the neutral point.

Thus, if instead of using thiosalicylic acid in the reaction shown in equation (3), one uses p-sulfhydryl benzene sulfonic acid, instead of the reaction shown in equation (3), one would get the following reaction:

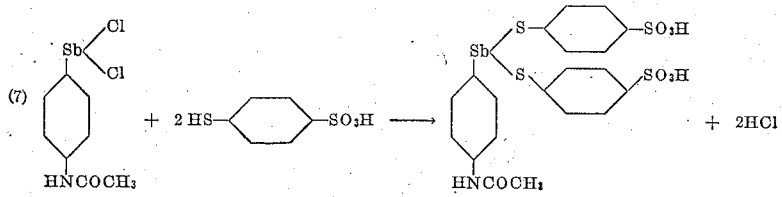

The acid produced by the above reaction is somewhat water soluble; and the solution of it may be given varying hydrogen ion concentrations by the addition of varying amounts of an alkali.

The effective compound thus produced thus contains a radical of the following general formula:

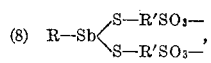

in which R' may be a suitable organic radical combinable with the $SO_3$ group to form a sulfonic acid. The radical shown in Formula 8 is merely a more specific example of the radical shown in Formula 6.

I give below a few examples of the many compounds which come within the scope of the broader claims of the present invention; though such examples are meant as illustrations and not as limitations.

*Example 1.*

For this example, it was necessary to prepare p-hydroxy phenyl stibinous iodide, $HO \cdot C_6H_4 \cdot SbI_2$, itself a new substance. This preparation was carried out in a manner analogous to the preparation of phenyl stibinous iodide. The method is as follows:—ten grams of p-hydroxy phenyl stibinic acid were dissolved in about 25 cc. concentrated hydrochloric acid (sp. gr. 1.18) and about 75 cc. glacial acetic acid, and filtered. A crystal of iodine is added, and a solution of 15 grams stannous chloride in about 45 cc. hydrochloric acid (sp. gr. 1.124) is added. Finally, the theoretical amount of potassium iodide is added in a concentrated aqueous solution. It is best to stand this solution in the ice box over night. The yellow crystalline precipitate is filtered off, washed with concentrated hydrochloric acid to remove tin compounds, then with ether, and dried. The crystals may be recrystallized from glacial acetic acid. Analysis indicated that the compound is probably of the structure indicated above. The compound has a melting point of 112°–115°, and is rather insoluble in acetone, ether, and alcohol.

To 0.28 grams of p-hydroxy phenyl stibinous iodide, suspended in 20 cc. of methyl or ethyl alcohol, is added gradually with stirring an alcoholic solution of 0.18 grams thiosalicylic acid. The following reaction takes place:

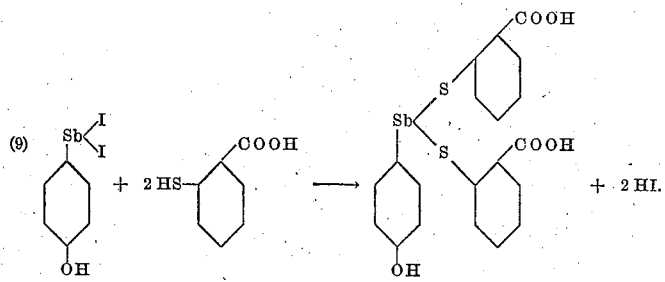

The solution is warmed on the bath for a short time at 50°–60° C., filtered from any residue, and concentrated to a small volume. It is allowed to drop into an equal volume of water, and the precipitate, the p-hydroxy phenylstibinous thiosalicylic acid, having the structural formula of the first term on the right-hand side of the foregoing reaction equation, is filtered off, washed with water, and dried on a porous plate in vacuo.

The compound as ordinarily prepared by the above method is a cream-colored substance having an indefinite melting point, decomposing when heated. It is insoluble in water and ether, and moderately soluble in acetone, and slowly soluble in absolute alcohol.

It is soluble in dilute alkalies and dilute sodium bicarbonate solution. Upon acidification of the latter solution a precipitate forms which gives a good test for antimony. It forms water-soluble salts with the alkali metals such as sodium or potassium, with ammonia, and with the alkaline-earth metals such as calcium. The structural formula of the sodium salt is:

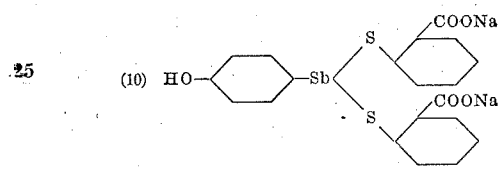

It is obvious that instead of the p-hydroxy phenyl stibinous iodide one may employ the corresponding chloride as the starting material, without affecting the final product.

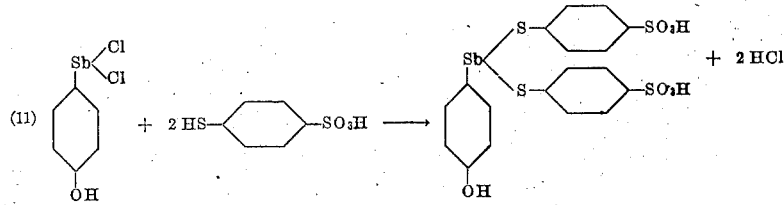

The precipitate which settles out in the above reaction is p-hydroxy phenylstibinous p-sulfo-benzene sulfonic acid having the structural formula of the first term on the right-hand side of the foregoing reaction equation.

This precipitate is collected on a filter, washed with absolute alcohol, and dried. As ordinarily obtained by the above reaction, this compound is a white substance which does not melt or show signs of decomposition when heated to 300° C.

It is quite readily soluble in water, concentrated hydrochloric acid, sodium carbonate, sodium bicarbonate, sodium hydroxide and other alkali hydroxide solutions. It dissolves in sodium bicarbonate giving a solution which, when faintly acidified throws out the acid again, and this acid gives a good qualitative test for antimony. The structural formula of the sodium salt is:

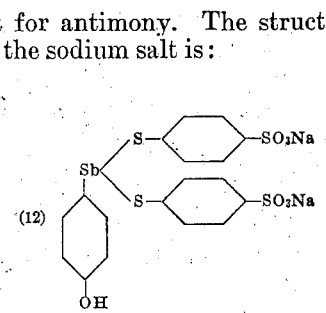

Example 2.

For this example, it was necessary to prepare p-hydroxy phenyl stibinous chloride, $HO \cdot C_6H_4 \cdot SbCl_2$, itself a new substance. This preparation was carried out in a manner analogous to the method which may be used for the preparation of phenyl stibinous chloride. The method is as follows: Ten grams of p-hydroxy phenyl stibinic acid were dissolved in about 25 c. c. concentrated hydrochloride (sp. gr. 1.18) and about 75 c. c. glacial acetic acid, and filtered. A crystal of iodine is added, and a solution of 15 grams stannous chloride in about 40 c. c. hydrochloric acid (sp. gr. 1.124) is added. It is best to stand this solution in the ice-box, say, over night. The yellow crystalline precipitate is filtered off, washed with a mixture of glacial acetic acid and concentrated hydrochloric acid, and pressed out on a porous plate. The analysis indicated that the compound is probably of the structure indicated above. The compound has a melting point of about 128°, and is insoluble in ether, benzene, and chloroform. It is soluble in acetone, methyl and ethyl alcohol.

To a solution of 0.85 grams of p-hydroxy phenyl stibinous chloride in about 15 c. c. of methyl or ethyl alcohol, is added gradually a solution of 1.1403 grams of p-sulfhydryl benzene sulfonic acid, in about 35 c. c. of 95% alcohol. On standing, a precipitate settles out in accordance with the reaction:

Example 3.

To 0.283 grams p-hydroxy phenyl stibinous chloride (for preparation, see Example 2) dissolved in about 30 c. c. of either methyl or ethyl alcohol, is added with stirring an alcoholic solution of 0.2 grams of thioglycolic acid. The reaction mixture may be warmed 5 to 10 minutes on the bath at 50°–60° C. The following reaction takes place:

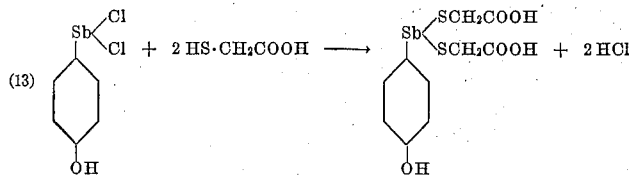

The product of the reaction, p-hydroxy phenylstibinous thioglycolic acid, having the structural formula of the first term on the right-hand side of the foregoing reaction equation, is isolated by evaporation of the solvent until a curdy residue remains, at which point ether is added and the insoluble portion collected on a filter, washed with ether and dried.

The product is very soluble in methyl alcohol, moderately soluble in acetone, and insoluble in ether and concentrated hydrochloric acid. It decomposes in a melting point tube. It is soluble in dilute alkali solution, and precipitates out as a flocculent material, when the alkaline solution is acidified. The water-soluble sodium salt has the structural formula:

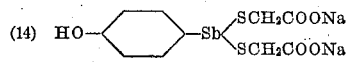

Example 4.

To 0.4 grams p-acetyl amino phenyl stibinous chloride hydrochloride monohydrate in about 15 c. c. ethyl alcohol is added an alcoholic solution of 0.34 grams thiosalicylic acid. The mixture is warmed to 60° C., and held at that temperature about five minutes. The solution is then filtered, and poured into an equal volume of water. The precipitate which separates is the p-acetyl amino phenyl stibinous thiosalicylic acid, with any unchanged reactants, obtained by the following reaction:

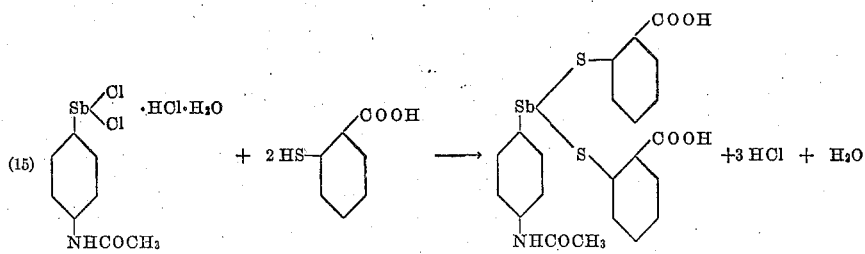

The product of the reaction has the formula of the first term on the right-hand side of the foregoing reaction equation. This precipitate is collected on a filter, washed well with water, and dried on a porous plate in a desiccator, and may be used without separating any unchanged reactants which may be present. The product is a white substance, melting around 200° C. It is soluble in alcohol, dilute sodium hydroxide and sodium bicarbonate solutions. It dissolves readily in 1% sodium bicarbonate giving a solution which when acidified throws out the material again, and this material gives a good qualitative test for antimony. The sodium, potassium, ammonium, and calcium salts are soluble in water. The water-soluble sodium salt has the formula:

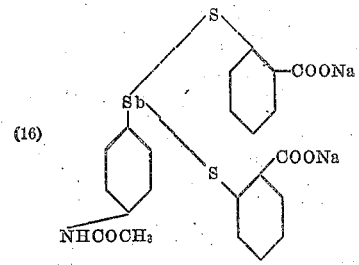

Example 5.

To 0.95 grams of p-acetyl amino phenylstibinous chloride hydrochloride monohydrate, dissolved in a small volume of ethyl or methyl alcohol is added gradually with stirring, an alcoholic solution of 0.66 grams of β-sulfhydryl propionic acid. The reaction mixture may be warmed on bath at 50°–60° C. to complete reaction. The following reaction takes place:

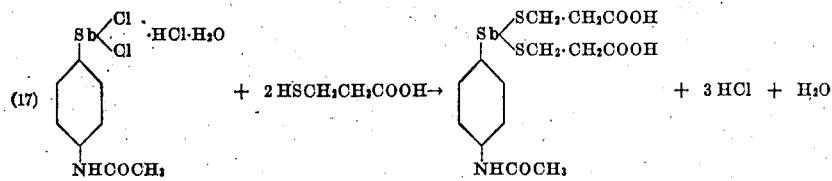

The product of the reaction, p-acetyl amino phenyl stibinous sulfo-propionic acid, having the structural formula of the first term on the right-hand side of the foregoing reaction equation, was isolated by concentrating of the solution to a small volume, and on the addition of ether, a gummy precipitate settled out, which crystallized on standing. The material is filtered off, washed with ether and dried. It shrinks at 100°–102° C. and melts at 105°–107° C. It is slightly soluble in water, readily soluble in dilute alkalies, forming soluble salts, the structure of the sodium salt being:

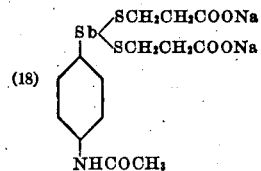

Example 6.

To 0.90 grams phenyl stibinous iodide, dissolved in a small quantity of ethyl or methyl alcohol, is added gradually with stirring an alcoholic solution containing 0.76 grams of p-sulfhydryl benzene sulfonic acid. A white precipitate forms during the addition of the sulfonic acid, indicating that the following reaction has taken place:

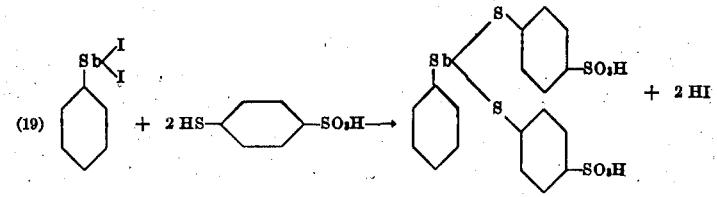

The precipitate, the phenyl stibinous sulfo-benzene sulfonic acid, having the structural formula as indicated in the first term on the right-hand side of the foregoing reaction equation, is filtered off, washed thoroughly with absolute alcohol, and dried on porous plate in a desiccator.

The phenyl stibinous sulfo-benzene sulfonic acid is of a pale cream color, and does not melt or darken when heated to 300° C.

Example 7.

To 1.90 grams p-acetyl amino phenyl stibinous chloride hydrochloride monohydrate, dissolved in about 25 c. c. of ethyl or methyl alcohol, is added gradually with stirring, an alcoholic solution containing 1.90 grams of p-sulfhydryl benzene sulfonic acid. A light colored precipitate forms immediately during the addition of the sulphonic acid, indicating that the following reaction has taken place.

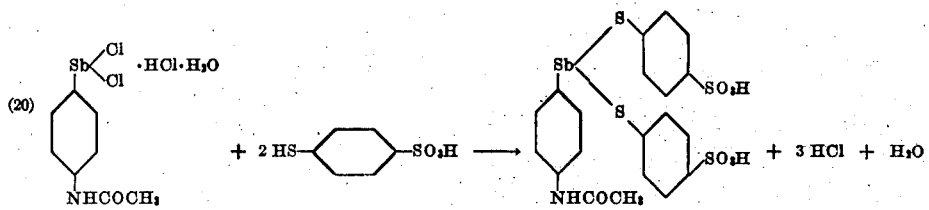

The precipitate which is p-acteyl amino phenyl stibinous sulfo-benzene sulfonic acid, having the structural formula as indicated in the first term on the right-hand side of the foregoing reaction equation, is filtered off, washed with absolute alcohol, and dried on a clay plate in a desiccator.

The p-acetyl amino phenyl stibinous sulfo benzene sulphonic acid is a light brown crystalline substance which does not melt or darken when heated to 300° C. It is somewhat soluble in water. It forms water-soluble salts with the alkali metals such as sodium and potassium, with ammonia, and with the alkaline earth metals such as calcium. The structural formula of the sodium salt is:

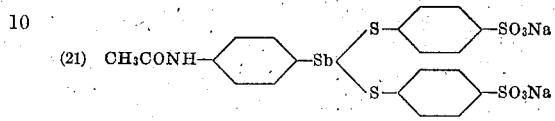

A solution of the sodium salt of p-acetyl amina phenyl stibinous sulfo-benzene sulphonic acid shows a marked trypanocidal activity.

*Example 8.*

For this example, it was necessary to prepare p-amino phenyl stibinous chloride which, so far as is known, is undescribed in the literature. The method is essentially as follows: p-amino phenyl stibinic acid in moist condition (4 grams calculated on dry basis) and 10 grams stannous chloride were treated gradually with 40 grams alcoholic hydrochloric acid, and, in order to hasten the reaction and to obtain a clear solution, the mixture is warmed on the bath for a short time at 50°–60° C. The solution is allowed to set in the ice-box over night, and the yellow crystalline precipitate is filtered off, washed with concentrated hydrochloric acid, and then ether. Fairly soluble in alcohol. The analysis of the compound agreed most closely with the formula, $NH_2 \cdot C_6H_4 \cdot SbCl_2$. In a melting point tube, it shrinks at 120° C, darkens at 220° C., and is not melted at 270° C.

To 1.0248 grams of p-amino phenyl stibinous chloride, suspended in 30 c. c. methyl or ethyl alcohol, is added gradually 1.1403 grams of p-sulfhydryl benzene sulfonic acid, dissolved in the minimum amount of methyl or ethyl alcohols, and the solution warmed on the steam bath for one hour. Filtered, and allowed to cool. A precipitate settled out, indicating that the following reaction had taken place:

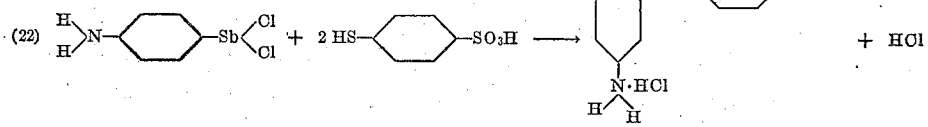

The precipitate, the hydrochloride of p-amino phenyl stibinous sulfo-benzene sulfonic acid, having the structural formula as indicated in the first term on the right-hand side of the foregoing reaction equation, is filtered off, washed with absolute alcohol, and dried on a porous plate in a desiccator.

The hydrochloride of p-amino phenyl stibinous sulfo-benzene sulfonic acid is of a pale cream color, and did not melt or darken when heated to 300° C. It is somewhat soluble in water and alcohol, and forms water-soluble salts with the alkali metals such as sodium or potassium, with ammonia, and with the alkaline earth metals such as calcium. The structural formula of the sodium salt is:

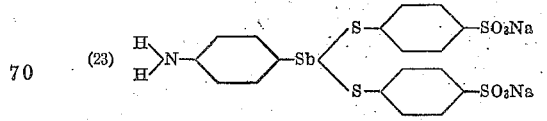

*Example 9.*

To 0.30 grams of p-amino phenyl stibinous chloride hydrochloride,

suspended in a small quantity of alcohol or acetone, is added gradually with stirring a concentrated alcoholic solution of 0.30 gram of thiosalicylic acid,

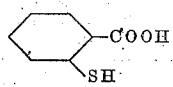

The whole goes into solution, the following reaction taking place:

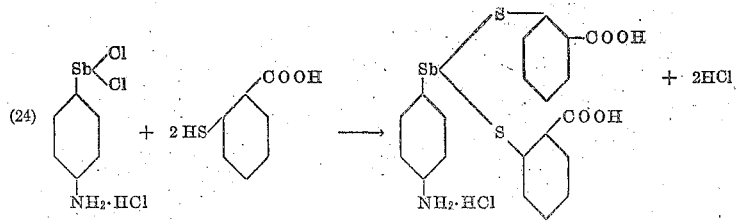

The alcohol solution, if not completely clear, is filtered, and the filtrate dropped into water. The p-amino phenylstibinous thiosalicylic acid hydrochloride, having the structural formula of the first term on the right hand side of the foregoing reaction equation separates out, and may be filtered off, dissolved in sodium carbonate, and is reprecipitated by acidifying, when a white flocculent precipitate results. This precipitate is filtered and dried. When air dried, it begins to decompose around 110°. The material is rather insoluble in acetone and alcohol, but dissolves very readily when hydrochloric acid is added to the solvent.

It is soluble in solutions of sodium bicarbonate, sodium carbonate, and alkali hydroxides, and slightly soluble in calcium hydroxide solutions. The structural formula of the sodium salt is:

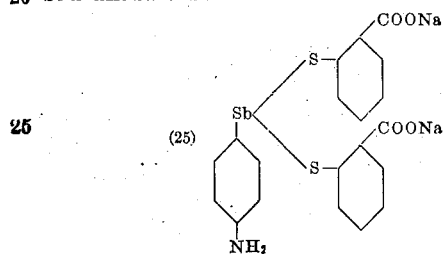

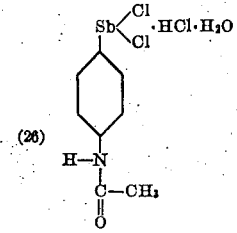
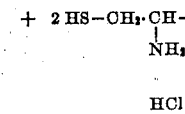

To isolate the product thus obtained two methods may be employed. Either the alcohol can be taken off in vacuo at a low temperature, or the condensation product may be precipitated with ether. In either case a white substance is obtained which is exceedingly hygroscopic, and for that reason it is difficult to determine the decomposition point of this material. The product thus obtained is readily soluble in hydrochloric acid (due to the presence of the amino group in the molecule), as well as in alkalies such as sodium and potassium hydroxide and alkali carbonates. It is also soluble in ammonium hydroxide.

It is not necessary to start with the hydrochloride of p-amino phenyl stibinous chloride, since the p-amino phenyl stibinous chloride or the p-amino phenyl stibinous oxide works just as well.

*Example 10.*

The hydrochloride of meta amino phenyl stibinous chloride may be condensed with thiosalicylic acid, following the procedure outlined in Example 9 for the para derivative, and the meta product thus obtained is similar in all respects to the para product above described.

*Example 11.*

To .3 grams of p-acetyl amino phenyl stibinous chloride hydrochloride monohydrate of the general formula, suspended in alcohol .2 grams of cystein hydrochloride is added. The whole thing goes into solution very readily, the following reaction taking place:

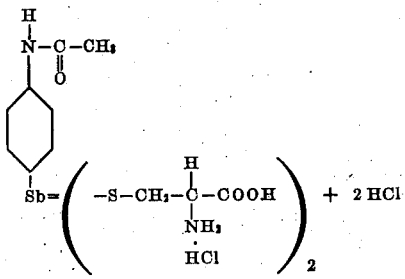

*Example 12.*

Phenyl stibinous iodide (one mole), which is rather insoluble in alcohol, is treated with two moles of thio salicylic acid, whereupon the whole material goes into solution very readily, the following reaction taking place:

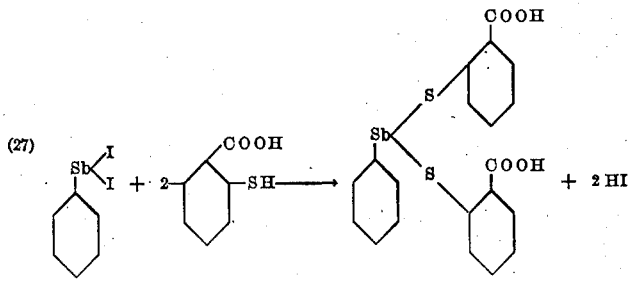

Instead of the iodide, one of course may employ more advantageously the oxide or the chloride. The condensation product thus obtained is isolated by pouring the acoholic solution into water. A white precipitate of phenyl stibinous thio-salicylic acid is obtained, which is soluble in sodium carbonate but insoluble in hydrochloric or sulfuric acids. The melting point is 186°.

I claim as my invention:

1. The step in the method of producing water-soluble compounds of organic stibinous compounds, which comprises treating, in a solvent, a stibinous compound in which at least one valence bond of the antimony is attached to an inorganic radical of other than the sulphur family (sulphur, selenium, and tellurium) and at least one valence bond of the antimony is directly attached to a carbon atom of an organic radical, with an organic compound containing both an acid radical and a sulfhydryl group and having the sulfhydryl group directly attached to a carbon atom.

2. The step in the method of producing water-soluble compounds of organic stibinous compounds, which comprises treating, in a solvent, a stibinous compound in which at least one valence bond of the antimony is attached to an inorganic radical of other than the sulphur family (sulphur, selenium, and tellurium) and at least one valence bond of the antimony is directly attached to a carbon atom of an organic radical of the aromatic series, with an organic compound containing both an acid radical and a sulfhydryl group and having the sulfhydryl group directly attached to a carbon atom.

3. The step in the method of producing water-soluble compounds of organic stibinous compounds, which comprises treating, in a solvent, a stibinous compound in which at least one valence bond of the antimony is attached to an inorganic radical of other than the sulphur family (sulphur, selenium, and tellurium) and at least one valence bond of the antimony is directly attached to a carbon atom of a substituted aromatic radical, with an organic compound containing both an acid radical and a sulfhydryl group and having the sulfhydryl group directly attached to a carbon atom.

4. The step in the method of producing water-soluble compounds of organic stibinous compounds, which comprises treating, in a solvent, a stibinous compound in which at least one valence bond of the antimony is attached to an inorganic radical of other than the sulphur family (sulphur, selenium, and tellurium) and at least one valence bond of the antimony is directly attached to a carbon atom of a substituted phenyl radical, with an organic compound containing both an acid radical and a sulfhydryl group and having the sulfhydryl group directly attached to a carbon atom.

5. The step in the method of producing water-soluble compounds of organic stibinous compounds, which comprises treating, in a solvent, a compound of the formula R—Sb=Y, in which Y comprises one or more replaceable inorganic radicals or groups other than of the sulphur family (sulphur, selenium, and tellurium) and having a total valence of two, and in which R is an organic radical having a carbon atom to which the antimony is directly attached, with an organic compound containing both an acid radical and a sulfhydryl group and having the sulfhydryl group directly attached to a carbon atom.

6. The step in the method of producing water-soluble compounds of organic stibinous compounds, which comprises treating, in a solvent, a compound of the formula R—Sb=Y, in which Y comprises one or more replaceable inorganic radicals or groups other than of the sulphur family (sulphur, selenium, and tellurium) and having a total valence of two, and in which R is a substituted aromatic radical having a carbon atom to which the antimony is directly attached, with an organic compound containing both an acid radical and a sulfhydryl group and having the sulfhydryl group directly attached to a carbon atom.

7. The step in the method of producing water-soluble compounds of organic stibinous compounds, which comprises treating, in a solvent, a compound of the formula R—Sb=O, in which R is an organic radical having a carbon atom to which the antimony is directly attached, with an organic compound containing both an acid radical and a sulfhydryl group and having the sulfhydryl group directly attached to a carbon atom.

8. The step in the method of producing water-soluble compounds of organic stibinous compounds, which comprises treating, in a solvent, a compound of the formula R—Sb=O, in which R is a substituted aromatic radical having a carbon atom to which the antimony is directly attached, with an organic compound containing both an acid radical and a sulfhydryl group and having the sulfhydryl group directly attached to a carbon atom.

9. A stibinous organic compound, in which at least one bond of a trivalent-antimony atom is attached to a carbon atom of an organic radical, and at least one other bond of the trivalent-antimony atom is attached to a sulphur atom, and the sulphur is also attached to a carbon atom of an organic radical containing an acid group which has a free valence bond capable of being attached either to hydrogen or to a metal.

10. A stibinous organic compound, in which at least one bond of a trivalent-antimony atom is attached to a carbon atom of an aromatic radical, and at least one other bond of the trivalent-antimony atom is attached to a sulphur atom, and the sulphur is also attached to a carbon atom of an organic radical containing an acid group which has a free valence bond capable of being attached either to hydrogen or to a metal.

11. A stibinous organic compound, in which at least one bond of a trivalent-antimony atom is attached to a carbon atom of a substituted aromatic radical, and at least one other bond of the trivalent-antimony atom is attached to a sulphur atom, and the sulphur is also attached to a carbon atom of an organic radical containing an acid group which has a free valence bond capable of being attached either to hydrogen or to a metal.

12. A stibinous organic compound, in which at least one bond of a trivalent-antimony atom is attached to a carbon atom of a substituted phenyl radical, and at least one other bond of the trivalent-antimony atom is attached to a sulphur atom, and the sulphur is also attached to a carbon atom of an organic radical containing an acid group which has a free valence bond capable of being attached either to hydrogen or to a metal.

13. A compound containing the following radical:

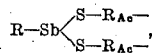

where R is any organic radical having a carbon atom directly attached to the antimony, and $R_{Ac}$ is an organic radical having a carbon atom directly attached to the sulphur atom and containing an acid group which has a free valence bond capable of being attached either to hydrogen or to a metal.

14. A compound containing the following radical:

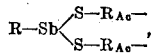

where R is an aromatic radical having a carbon atom directly attached to the antimony, and $R_{Ac}$ is an organic radical having a carbon atom directly attached to the sulphur atom and containing an acid group which has a free valence bond capable of being attached either to hydrogen or to a metal.

15. A compound containing the following radical:

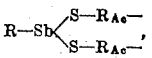

where R is a substituted aromatic radical having a carbon atom directly attached to the antimony, and $R_{Ac}$ is an organic radical having a carbon atom directly attached to the sulphur atom and containing an acid group which has a free valence bond capable of being attached either to hydrogen or to a metal.

16. A compound containing the following radical:

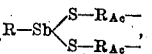

where R is a substituted phenyl radical having a carbon atom directly attached to the antimony, and $R_{Ac}$ is an organic radical having a carbon atom directly attached to the sulphur atom and containing an acid group which has a free valence bond capable of being attached either to hydrogen or to a metal.

17. A compound containing the following radical:

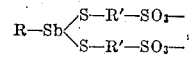

where R is any organic radical having a carbon atom directly attached to the antimony, and R′ is an organic radical which has a carbon atom directly attached to the sulfide sulphur atom and which is combinable with an $SO_3$ group to form a sulfonic acid.

18. A compound containing the following radical:

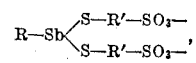

where R is an aromatic radical having a carbon atom directly attached to the antimony, and R′ is an organic radical which has a carbon atom directly attached to the sulfide sulphur atom and which is combinable with an $SO_3$ group to form a sulfonic acid.

19. A compound containing the following radical:

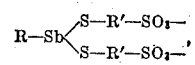

where R is a substituted aromatic radical having a carbon atom directly attached to the antimony, and R′ is an organic radical which has a carbon atom directly attached to the sulfide sulphur atom and which is combinable with an $SO_3$ group to form a sulfonic acid.

20. A compound containing the following radical:

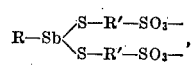

where R is a substituted phenyl radical having a carbon atom directly attached to the antimony, and R′ is an organic radical which has a carbon atom directly attached to the sulfide sulphur atom and which is combinable with an $SO_3$ group to form a sulfonic acid.

21. A compound containing the following radical:

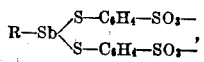

in which R is any organic radical having a carbon atom directly attached to the antimony.

22. A compound containing the following radical:

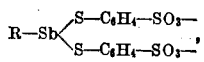

in which R is an aromatic radical having a carbon atom directly attached to the antimony.

23. A compound containing the following radical:

$$R-Sb\begin{matrix}S-C_6H_4-SO_3-\\S-C_6H_4-SO_3-\end{matrix}$$

in which R is a substituted aromatic radical having a carbon atom directly attached to the antimony.

24. A compound containing the following radical:

$$R-Sb\begin{matrix}S-C_6H_4-SO_3-\\S-C_6H_4-SO_3-\end{matrix}$$

in which R is a substituted phenyl radical having a carbon atom directly attached to the antimony.

In witness whereof, I have hereunto set my hand at Indianapolis, Indiana, this 28th day of December, A. D. one thousand nine hundred and twenty seven.

MORRIS S. KHARASCH.